(12) United States Patent
Martin et al.

(10) Patent No.: US 9,810,122 B2
(45) Date of Patent: Nov. 7, 2017

(54) ENGINE EXHAUST TEMPERATURE CONTROL

(71) Applicant: Ford Global Technologies, LLC, Dearborn, MI (US)

(72) Inventors: Douglas Raymond Martin, Canton, MI (US); John Eric Rollinger, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 150 days.

(21) Appl. No.: 14/746,616

(22) Filed: Jun. 22, 2015

(65) Prior Publication Data

US 2016/0369687 A1    Dec. 22, 2016

(51) Int. Cl.
| | | |
|---|---|---|
| *F02B 33/44* | (2006.01) | |
| *F01N 3/20* | (2006.01) | |
| *F02B 37/10* | (2006.01) | |
| *F02B 37/16* | (2006.01) | |
| *F02B 39/12* | (2006.01) | |
| *F02D 13/02* | (2006.01) | |
| *F02D 41/00* | (2006.01) | |
| *F02D 41/02* | (2006.01) | |

(52) U.S. Cl.
CPC .......... *F01N 3/2066* (2013.01); *F01N 3/204* (2013.01); *F01N 3/2046* (2013.01); *F02B 37/105* (2013.01); *F02B 37/166* (2013.01); *F02B 37/168* (2013.01); *F02B 39/12* (2013.01); *F02D 13/0269* (2013.01); *F02D 41/0007* (2013.01); F01N 2610/03 (2013.01); F02B 2275/32 (2013.01); F02D 2041/0265 (2013.01); Y02T 10/142 (2013.01); Y02T 10/144 (2013.01); Y02T 10/26 (2013.01)

(58) Field of Classification Search
CPC .... F02B 33/40; F02B 2275/32; F02B 37/105; F02B 37/166; F02B 37/168; F02B 39/12; F01N 3/2066; F01N 2610/03; F01N 3/204; F01N 3/2046; F02D 13/02; F02D 13/0269; F02D 2041/0265; F02D 41/0007; Y02T 10/142; Y02T 10/144
USPC .......................................................... 60/611
See application file for complete search history.

(56) References Cited

U.S. PATENT DOCUMENTS

| | | | | |
|---|---|---|---|---|
| 2,636,344 | A | * | 4/1953 | Heath ....................... F02C 7/16 60/207 |
| 4,548,040 | A | * | 10/1985 | Miller ................... F01D 25/002 415/117 |
| 4,635,590 | A | * | 1/1987 | Gerace .................. F01B 3/0005 123/190.1 |

(Continued)

OTHER PUBLICATIONS

Möller, C. et al., "Divided Exhaust Period—A Gas Exchange System for Turbocharged SI Engines," SAE Technical Paper Series No. 2005-01-1150, 2005 SAE World Congress, Detroit, MI., Apr. 11-14, 2005, 15 pages.

(Continued)

*Primary Examiner* — Jesse Bogue
(74) *Attorney, Agent, or Firm* — Julia Voutyras; McCoy Russell LLP

(57) ABSTRACT

Methods and systems for improving operation of an engine at higher speeds and loads are disclosed. In one example, fuel may be injected to an exhaust system of the engine so that temperatures of exhaust system components may be reduced when the engine is operated at higher speeds and loads.

16 Claims, 9 Drawing Sheets

(56) References Cited

U.S. PATENT DOCUMENTS

| | | |
|---|---|---|
| 6,169,332 B1 | 1/2001 | Taylor et al. |
| 6,460,337 B1 | 10/2002 | Olofsson |
| 6,553,977 B2 | 4/2003 | Schintz |
| 6,595,183 B1 | 7/2003 | Olofsson |
| 7,040,094 B2 | 5/2006 | Fischer et al. |
| 7,490,594 B2 | 2/2009 | Van Dyne et al. |
| 8,069,663 B2 | 12/2011 | Ulrey et al. |
| 8,091,357 B2 | 1/2012 | Robel |
| 8,364,378 B2 | 1/2013 | De Graaff et al. |
| 8,432,048 B1 | 4/2013 | Paulino |
| 8,468,801 B2 | 6/2013 | Shimizu et al. |
| 8,479,511 B2 | 7/2013 | Pursifull et al. |
| 8,511,084 B2 | 8/2013 | Ulrey et al. |
| 8,539,770 B2 | 9/2013 | Williams |
| 8,601,811 B2 | 12/2013 | Pursifull et al. |
| 8,701,409 B2 | 4/2014 | Pursifull et al. |
| 8,745,990 B2 | 6/2014 | Burkholder et al. |
| 8,783,020 B2 * | 7/2014 | Springer ............... F01N 3/021 60/285 |
| 8,820,056 B2 | 9/2014 | VanDyne et al. |
| 2002/0083700 A1 * | 7/2002 | Ellmer .................. F01N 3/32 60/278 |
| 2004/0055298 A1 * | 3/2004 | Fischer .................. F01N 3/26 60/606 |
| 2005/0229900 A1 * | 10/2005 | Weber ............... F01N 3/2073 123/316 |
| 2010/0199666 A1 * | 8/2010 | VanDyne ............ F02B 37/105 60/605.2 |
| 2010/0294254 A1 * | 11/2010 | Ward .................. F01L 1/34 123/65 R |
| 2011/0277453 A1 * | 11/2011 | Anderlohr ............ F01N 3/22 60/287 |
| 2012/0203434 A1 * | 8/2012 | Sujan ................... B60W 50/14 701/64 |
| 2013/0247562 A1 * | 9/2013 | Mischler .............. F01N 9/002 60/602 |
| 2014/0158072 A1 * | 6/2014 | Williams ............. F02B 75/021 123/64 |
| 2014/0311124 A1 * | 10/2014 | Tsujimoto ........... F01N 13/0097 60/274 |

OTHER PUBLICATIONS

Roth, D. et al., "Valve-Event Modulated Boost System," SAE Technical Paper Series No. 2010-01-1222, BorgWarner Engine Systems Group, Apr. 12, 2010, 16 pages.

Roth, D. et al., "Valve-Event Modulated Boost System: Fuel Consumption and Performance with Scavenge-Sourced EGR," SAE Technical Paper Series No. 2012-01-0705, BorgWarner Inc., Apr. 16, 2012, 9 pages.

Hu, B. et al., "1-D Simulation Study of Divided Exhaust Period for a Highly Downsized Turbocharged SI Engine—Scavenge Valve Optimization," SAE Technical Paper Series No. 2014-01-1656, Apr. 1, 2014, 10 pages.

Haugton, A. et al., "Development of an Exhaust Driven Turbine-Generator Integrated Gas Energy Recovery System (TIGERS®)," SAE Technical Paper Series No. 2014-01-1873, Controlled Power Technologies, Apr. 1, 2014, 8 pages.

Leon, T. et al., Systems and Methods for Control of Turbine-Generator Via Valve Deactivation in a Split Exhaust Engine System, U.S. Appl. No. 14/537,697, filed Nov. 10, 2014, 51 pages.

Ulrey, J. et al., "System and Methods for Control of Turbine-Generator Via Exhaust Valve Timing and Duration Modulation in a Split Exhaust Engine System," U.S. Appl. No. 14/537,722, filed Nov. 10, 2014, 58 pages.

* cited by examiner

FIG. 4

ENGINE EXHAUST TEMPERATURE CONTROL

BACKGROUND/SUMMARY

An engine may typically operate near stoichiometric conditions to improve efficiency of a catalyst that processes engine output emissions. If the engine is operated at higher engine speeds and loads with a stoichiometric air-fuel ratio, exhaust temperatures may rise above desired temperatures for exhaust system components. For example, exhaust temperatures may increase above desired catalyst temperatures or exhaust turbine temperatures. Therefore, it may be desirable to operate the engine in a way that limits exhaust temperatures to less than a threshold temperature. One way to reduce engine exhaust temperatures is to operate the engine with a rich air-fuel mixture. The rich air-fuel mixture reduces combustion temperature and extracts thermal energy from the engine, thereby cooling the engine and exhaust. Nevertheless, operating the engine with a rich air-fuel mixture may degrade vehicle emissions since three-way catalysts provide highest exhaust gas conversion efficiency when supplied exhaust gases produced by engine cylinders operating with near stoichiometric air-fuel ratios. Consequently, it may be desirable to operate an engine in a way that provides low emissions while operating below a threshold exhaust temperature at higher engine speeds and loads.

The inventors herein have recognized the above-mentioned disadvantages and have developed an engine operating method, comprising: operating a Miller cycle engine with fuel injected in an exhaust system of the Miller cycle engine at a location upstream of a turbine coupled to a crankshaft of the Miller cycle engine; and passing exhaust gases from the Miller cycle engine through the turbine.

By injecting fuel upstream of a turbine to provide a rich exhaust gas mixture, turbine vane temperatures may be reduced so that the Miller cycle engine may be operated at lean best torque rather than rich best torque during high engine speed and load conditions. Consequently, the engine may use less fuel at higher engine speeds and loads while exhaust system components temperatures are constrained. Further, in some examples, the rich exhaust gas mixture may be ignited so that the turbine delivers torque to a vehicle powertrain. Further still, the rich exhaust gas mixture may be combined with air at a location upstream of a catalyst to provide a stoichiometric exhaust gas mixture to the catalyst to provide high catalyst efficiency. In this way, engine exhaust temperatures may be maintained lower than a threshold temperature to reduce the possibility of exhaust system component degradation without reducing catalyst efficiency.

The present description may provide several advantages. For example, the approach may reduce the possibility of exhaust system component degradation. Further, the approach may reduce vehicle exhaust emissions at higher engine speeds and loads. Additionally, the approach may increase vehicle power during higher driver demand conditions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 1-4 show schematic depictions of an engine.

DETAILED DESCRIPTION

Figure 1:
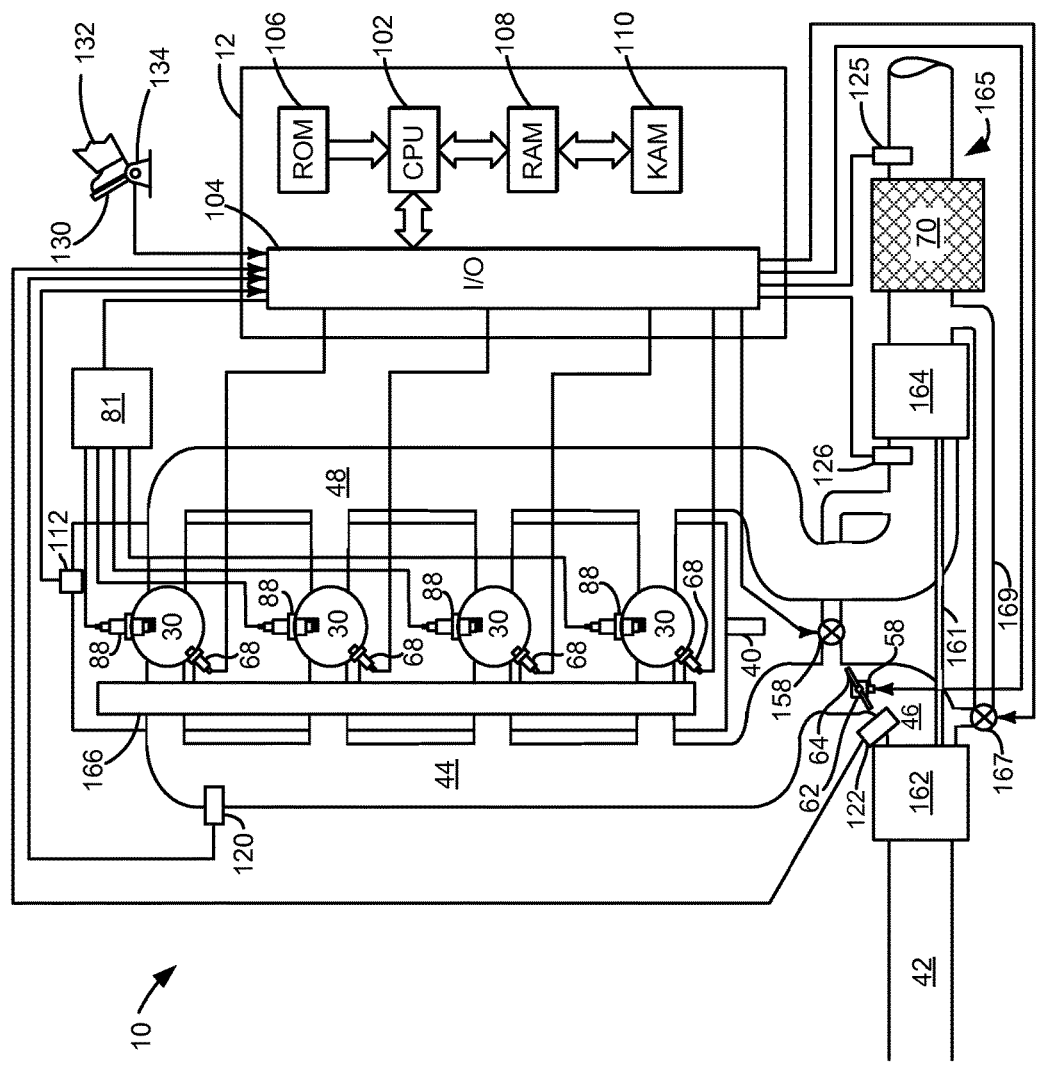
Figure 2:
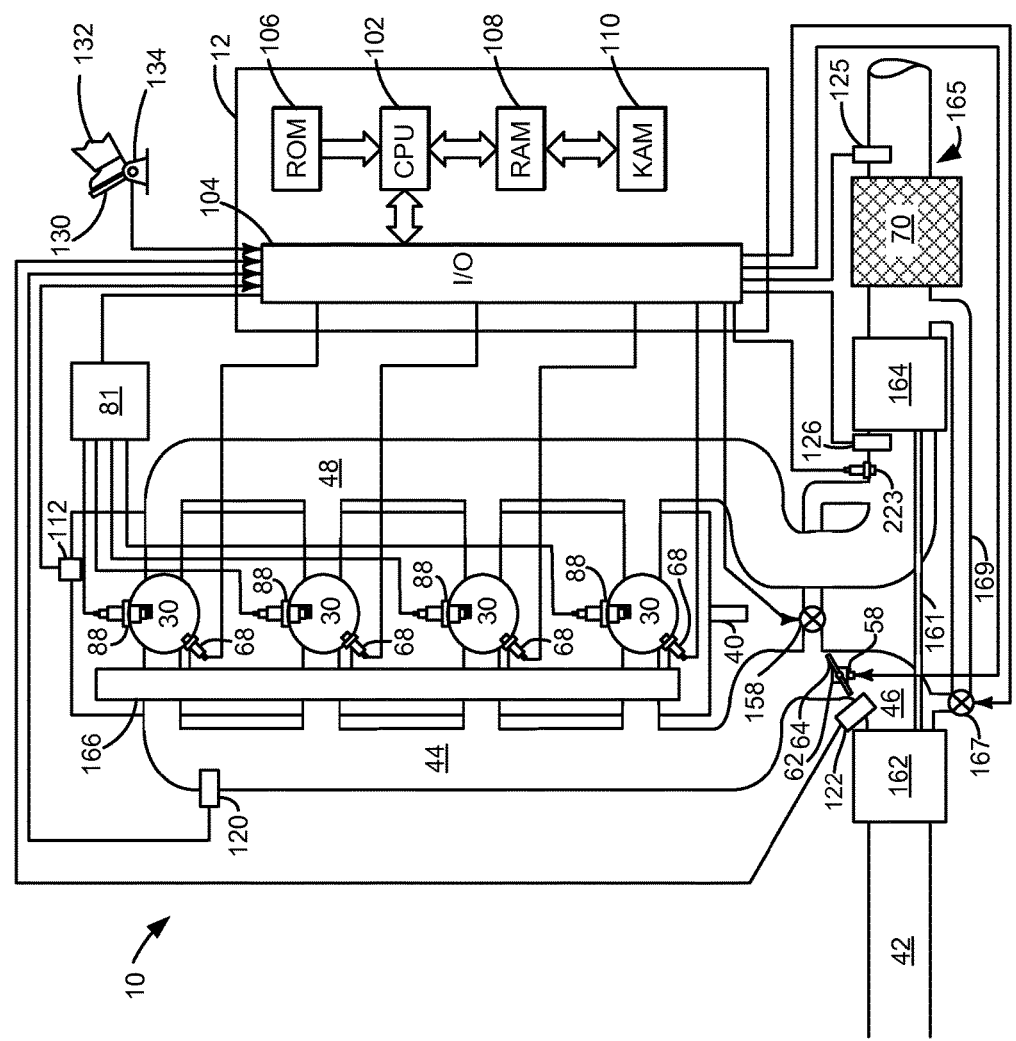
Figure 3:
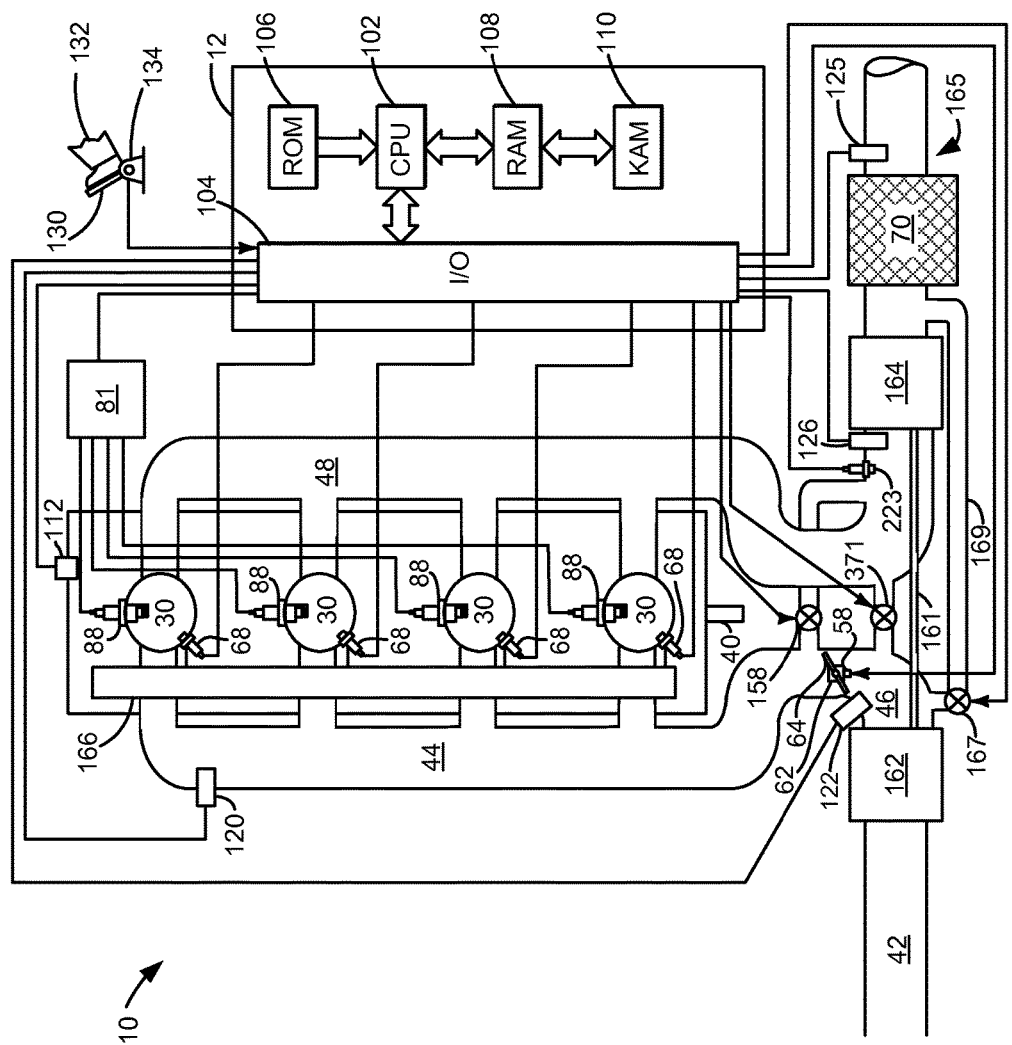
Figure 4:
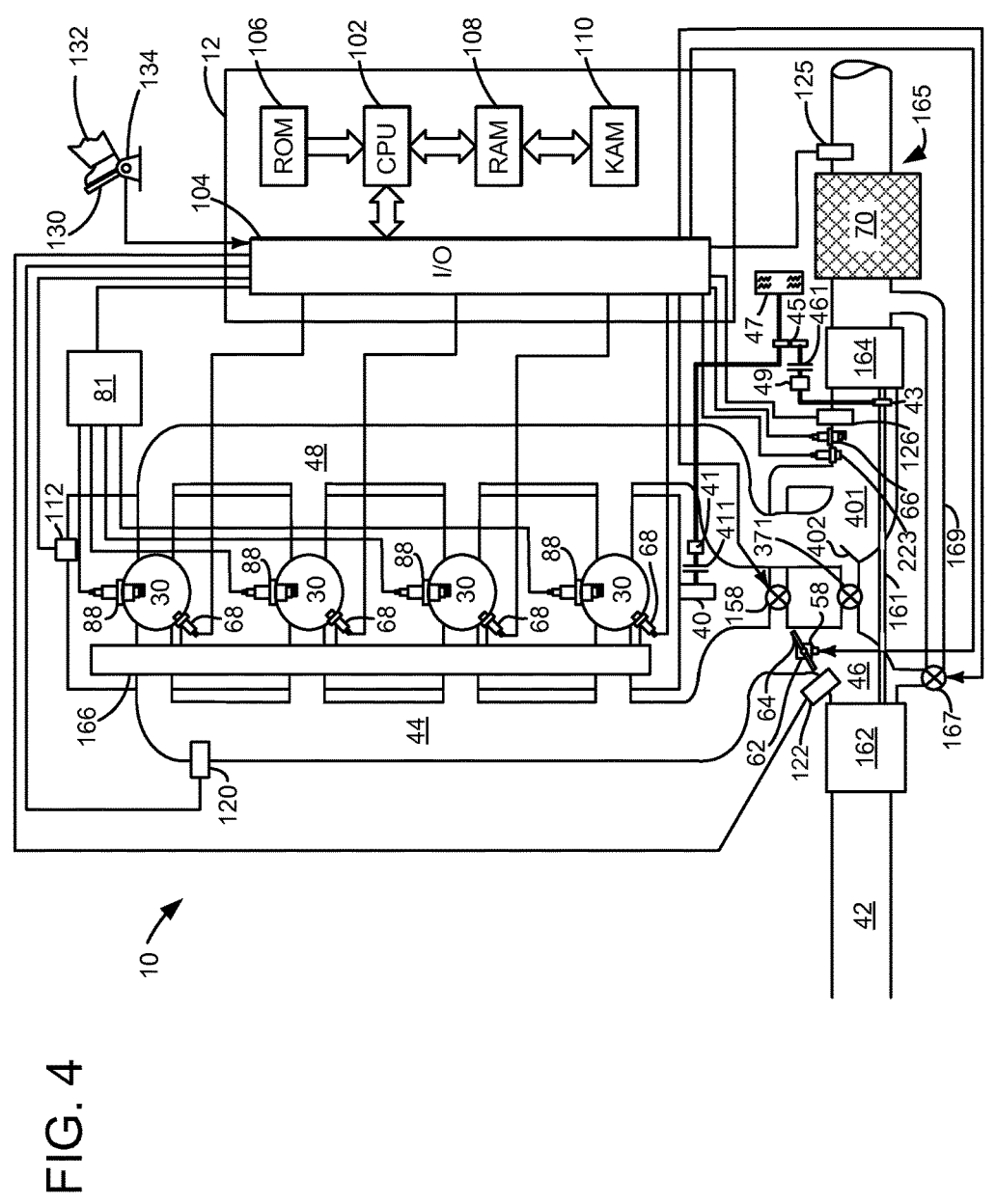
Figure 9:
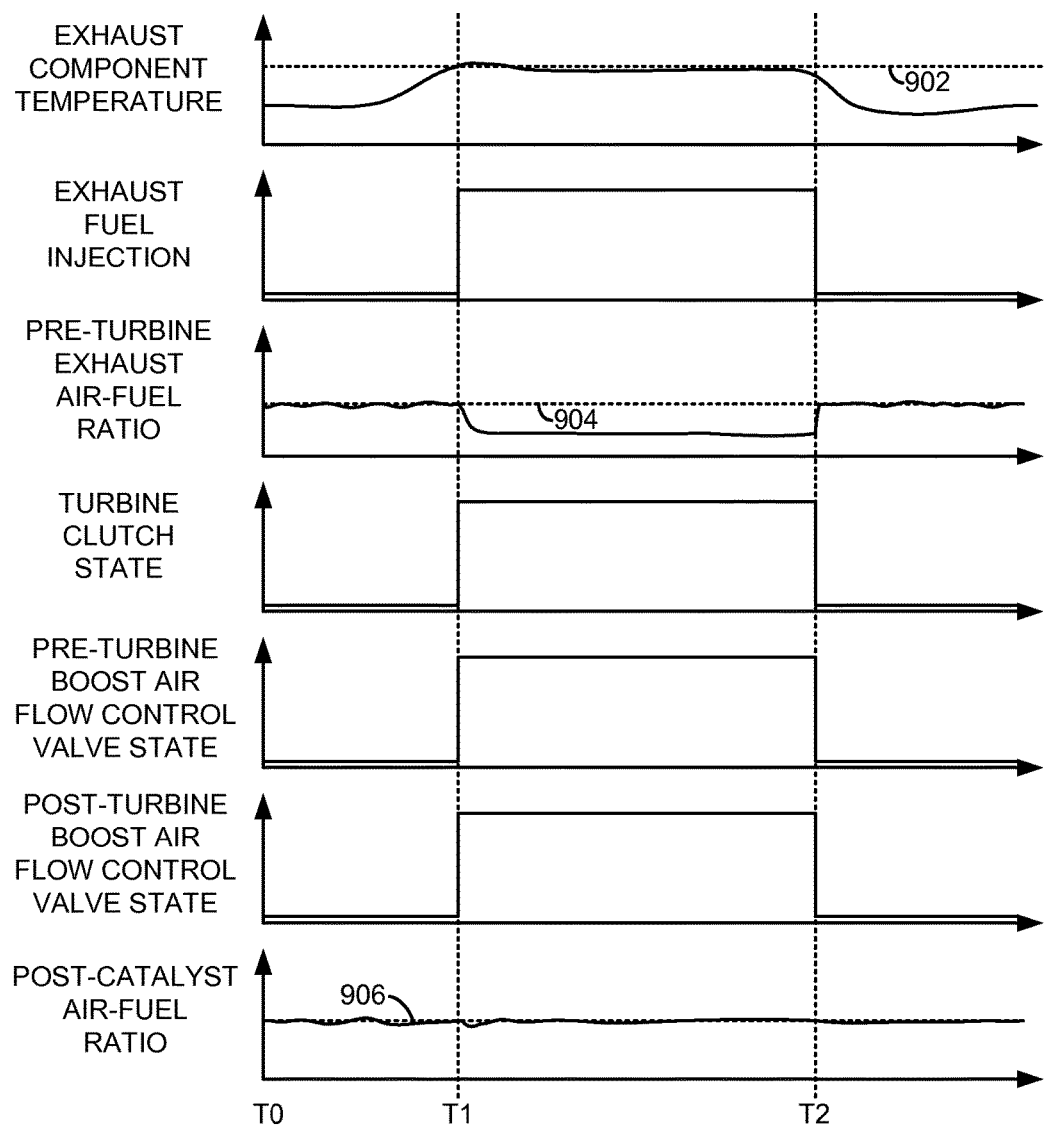
FIG. 9 shows an example operating sequence.

The present description is related to controlling temperatures of exhaust system components to temperatures less than a threshold temperature that may identify an onset of exhaust system component degradation. FIG. 1 shows an example Miller cycle engine where exhaust system component temperatures may be limited to less than the threshold temperature. FIG. 2 shows another example Miller cycle engine where exhaust system component temperatures may be limited via injecting fuel into the exhaust system. FIG. 3 shows still another example Miller cycle engine where exhaust system component temperatures may be limited via injecting fuel into the exhaust system. FIG. 4 shows a compound engine including a Miller cycle engine and a turbine. FIGS. 5-8 show a method for controlling exhaust temperatures of a Miller cycle engine. FIG. 9 shows an example engine operating sequence.

Referring to FIG. 1, internal combustion engine 10, comprising a plurality of cylinders 30, is controlled by electronic engine controller 12. Engine 10 may be a Miller cycle engine where compressed air is provided to engine intake manifold 44 and where intake valves close after bottom dead center intake stroke so that a portion of cylinder contents are expelled to intake manifold 44 during the engine's compression stroke. Engine 10 includes cylinders 30 including pistons (not shown) therein and connected to crankshaft 40. Crankshaft 40 selectively supplies torque to vehicle wheels (not shown). Cylinders 30 are shown communicating with intake manifold 44 and exhaust manifold 48 via respective intake valves and exhaust valves (not shown). Each intake and exhaust valve may be operated by a cam (not shown).

Fuel injectors 68 are shown positioned to inject fuel directly into combustion chambers 30, which is known to those skilled in the art as direct injection. Fuel injectors 68 deliver fuel in proportion to a pulse width from controller 12. Fuel is delivered to fuel injectors 68 by a fuel system including a fuel tank (not shown), fuel pump (not shown), and fuel rail 166.

Ignition system 81 supplies electrical energy to spark plugs 88 in response to pulse widths of a signal provided by controller 12. Each spark plug 88 may be operated independently of the remaining spark plugs.

Intake manifold 44 is shown communicating with optional electronic throttle 62 which adjusts a position of throttle plate 64 to control air flow from intake boost chamber 46. Compressor 162 draws air from air intake 42 to supply boost chamber 46. Exhaust gases spin turbine 164 which is coupled to compressor 162 via shaft 161. In some examples, a charge air cooler may be provided and compressor 162 may be driven via a motor or crankshaft 40 instead of turbine 164. Turbine 164 may include variable vanes such that exhaust gases may pass through turbine 164 supplying little energy to rotate turbine 164 when vanes are in an open position. Exhaust gases may pass through turbine 164 and impart increased force on turbine 164 when vanes are in a closed position.

Combustion is initiated in cylinders 30 when fuel ignites via spark plugs 88. In some examples, a universal Exhaust Gas Oxygen (UEGO) sensor 126 may be coupled to exhaust manifold 48 upstream of emissions device 70 (e.g., three-way catalyst). In other examples, the UEGO sensor may be located downstream of one or more exhaust after treatment devices. Further, in some examples, the UEGO sensor may be replaced by a NOx sensor that has both NOx and oxygen sensing elements. Additionally, an oxygen sensor 125 is positioned downstream from emissions device 70.

Exhaust gas recirculation (EGR) may be provided to the engine via EGR valve 158. EGR valve 158 may be selectively opened and closed to allow exhaust gases to flow from exhaust manifold 48 to intake manifold 44 when intake manifold pressure is less than exhaust manifold pressure.

Compressed air may be supplied from compressor 162 to exhaust passage 165 at a location downstream of turbine 164 and upstream of emissions device 70 via post-turbine boost air flow control valve 167 and passage 169. Exhaust passage 165 carries exhaust gas from exhaust manifold 48 to atmosphere.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112; a position sensor 134 coupled to an accelerator pedal 130 for sensing accelerator position adjusted by driver 132; a measurement of engine manifold pressure (MAP) from pressure sensor 120 coupled to intake manifold 44; boost pressure from pressure sensor 122; exhaust gas oxygen concentration from oxygen sensor 126; and a measurement of throttle position from sensor 58. Barometric pressure may also be sensed (sensor not shown) for processing by controller 12.

During operation, each cylinder within engine 10 typically undergoes a four stroke cycle: the cycle includes the intake stroke, compression stroke, expansion stroke, and exhaust stroke. During the intake stroke of a cylinder 30, generally, an exhaust valve closes and intake valve opens. Air is introduced into cylinder 30 via intake manifold 44, and a piston moves to the bottom of the cylinder so as to increase the volume within cylinder 30. The position at which the piston is near the bottom of the cylinder and at the end of its stroke (e.g., when cylinder 30 is at its largest volume) is typically referred to by those of skill in the art as bottom dead center (BDC). During the compression stroke, the intake valve and the exhaust valve are closed. A piston in cylinder 30 moves toward the cylinder head so as to compress the air within cylinder 30. The point at which the piston is at the end of its stroke and closest to the cylinder head (e.g., when cylinder 30 is at its smallest volume) is typically referred to by those of skill in the art as top dead center (TDC). In a process hereinafter referred to as injection, fuel is introduced into the combustion chamber. In some examples, fuel may be injected to a cylinder a plurality of times during a single cylinder cycle. In a process hereinafter referred to as ignition, the injected fuel is ignited by spark plug 88 resulting in combustion. During the expansion stroke, the expanding gases push the piston back to BDC. Crankshaft 40 converts piston movement into a rotational torque of the rotary shaft. Finally, during the exhaust stroke, the exhaust valve opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples. Further, in some examples a two-stroke cycle may be used rather than a four-stroke cycle.

Air flow through engine 10 begins at intake 42 and proceeds to compressor 162. Air exits compressor 162 entering boost chamber 46 before proceeding to intake manifold 44. The air then flows though cylinders 30 before exiting as exhaust gas after participating in combustion. Exhaust gases enter exhaust manifold 48 before proceeding to turbine 164. Exhaust gases exit turbine 164 and enter emissions device 70 before being released to atmosphere. Thus, intake 42 is located upstream of emissions device 70 based on a direction of flow through engine 10.

If the system of FIG. 1 is operated at higher speeds and loads where a temperature of an exhaust system component (e.g., vanes of turbine 164) is greater than a component degradation threshold temperature, the engine is transitioned from operating the engine with stoichiometric air-fuel ratios to operating the engine with air and fuel mixtures rich of stoichiometry to reduce temperatures of exhaust system components. The component degradation threshold temperature represents a temperature where exhaust component degradation may occur if the exhaust system component is above the component degradation threshold temperature for a predetermined amount of time. The rich engine air-fuel ratio increases heat transfer out of the engine and reduces combustion temperatures. The post-turbine boost air flow control valve is opened in response to a temperature of an exhaust system component (e.g., vanes of turbine 164) being greater than the component degradation threshold temperature. In one example, air flow through post-turbine boost air flow control valve 167 is commanded to an open loop position based on engine fuel flow, engine air mass flow, and the amount of fuel injected to exhaust passage 165. The open loop valve position is then adjusted responsive to oxygen sensor 125 to provide stoichiometric exhaust gases entering emissions control device 70.

In this way, the system of FIG. 1 provides for reducing exhaust component temperatures while providing higher catalyst efficiency. The catalyst efficiency is maintained or increased by providing stoichiometric exhaust gases to the catalyst. As a result, engine exhaust components may be protected from higher temperatures while engine emissions are maintained or improved.

Referring now to FIG. 2, a second example engine is shown. The engine of FIG. 2 operates similar to the engine of FIG. 1. Further, the engine of FIG. 2 includes many of the same components described in FIG. 1. The elements of FIG. 2 that are the same as the elements of FIG. 1 are labeled with the same numerical references. Therefore, for the sake of brevity, only components and operations not common with FIG. 1 will be described.

The system of FIG. 2 includes fuel injector 223 for injecting fuel into exhaust passage 165. Fuel may be injected via injector 223 in response to a temperature of an exhaust system component (e.g., vanes of turbine 164) being greater than a component degradation threshold temperature. The component degradation threshold temperature represents a temperature where exhaust component degradation may occur if the exhaust system component is above the component degradation threshold temperature for a predetermined amount of time. By injecting fuel via injector 223, the exhaust gases may be richened and cooled so as to transfer heat from exhaust system components to the atmosphere after being discharged via passage 165. Engine 10 may be operated at lean best torque (e.g., (LBT), a leanest engine air-fuel ratio that is rich of stoichiometry that produces best engine torque at an engine speed, load, and knock limited spark timing) when injector 223 is activated. In one example, the amount of fuel injected by fuel injector 223 is based on engine speed and load. At higher engine speeds and loads, the exhaust mass flow rate increases so the amount of fuel injected by injector 223 is increased. The amount of fuel injected via injector 223 is empirically determined and stored in tables or functions indexed via engine speed and load. Operating the engine at LBT and injecting fuel in exhaust passage 165 upstream of turbine 164 provides exhaust gases rich of stoichiometric exhaust gases upstream of turbine 164.

Additionally, air flow through post-turbine boost air flow control valve 167 is adjusted to provide a stoichiometric exhaust gas mixture in exhaust passage 165 upstream of emissions device 70 and downstream of turbine 164. In one example, air flow through air flow through post-turbine boost air flow control valve 167 is adjusted to an open loop position based on fuel injected to engine 10, fuel injected to exhaust passage 165, and air flow through engine 10. The open loop position of valve 167 is further adjusted in response to post emissions control device oxygen sensor 125. For example, if oxygen sensor 125 indicates rich exhaust gases, post-turbine boost air flow control valve 167 opening amount is increased to provide stoichiometric exhaust gases at oxygen sensor 125.

In this way, the system of FIG. 2 provides for reducing exhaust component temperatures while providing higher catalyst efficiency. Operating the engine at LBT reduces fuel consumption as compared to operating the engine at rich best torque (e.g., (RBT) a richest engine air-fuel ratio that is rich of stoichiometry and that produces best engine torque at an engine speed, load, and knock limited spark timing) and injecting fuel to the exhaust passage provides cooling closer to the component operating at the higher temperature. Catalyst efficiency is maintained or increased by providing stoichiometric exhaust gases to the catalyst. As a result, engine exhaust components may be protected from higher temperatures while engine emissions are maintained or improved.

Referring now to FIG. 3, a third example engine is shown. The engine of FIG. 3 operates similar to the engine of FIG. 1. Additionally, the engine of FIG. 3 includes many of the same components described in FIGS. 1 and 2. The elements of FIG. 3 that are the same as the elements of FIGS. 1 and 2 are labeled with the same numerical references. Therefore, for the sake of brevity, only components and operations not common with FIGS. 1 and 2 will be described.

The system of FIG. 3 includes a pre-turbine boost air flow control valve 371. Valve 371 selectively allows air to flow from boost chamber 46 to exhaust passage 165. Compressor 162 may pressurize air at higher pressures than pressure of exhaust in exhaust passage 165. In one example, an open loop opening amount of valve 371 is based on engine air flow (e.g., the amount of air flowing through the engine), engine fuel flow (e.g., the amount of fuel flowing through the engine), and the amount of fuel injected via fuel injector 223. Further, the position of valve 371 is adjusted in response to output of oxygen sensor 126 to provide a desired air-fuel ratio at an inlet of turbine 164. The desired air-fuel ratio at oxygen sensor 126 is rich of stoichiometry if exhaust component temperatures are greater than the component degradation threshold temperature. Fuel may be injected via injector 223 in response to a temperature of an exhaust system component (e.g., vanes of turbine 164) being greater than a component degradation threshold temperature. Engine 10 may be operated at lean best torque (e.g., (LBT), a leanest engine air-fuel ratio that is rich of stoichiometry that produces best engine torque at an engine speed, load, and knock limited spark timing) when injector 223 is activated.

Additionally, air flow through post-turbine boost air flow control valve 167 is adjusted to provide a stoichiometric exhaust gas mixture in exhaust passage 165 upstream of emissions device 70 and downstream of turbine 164. In one example, air flow through air flow through post-turbine boost air flow control valve 167 is adjusted to an open loop position based on fuel injected to engine 10, fuel injected to exhaust passage 165, and air flow through engine 10. The open loop position of valve 167 is further adjusted in response to post emissions control device oxygen sensor 125.

In this way, the system of FIG. 3 provides for reducing exhaust component temperatures while providing higher catalyst efficiency. Operating the engine at LBT reduces fuel consumption as compared to operating the engine at rich best torque (e.g., (RBT) a richest engine air-fuel ratio that is rich of stoichiometry and that produces best engine torque at an engine speed, load, and knock limited spark timing) and injecting fuel to the exhaust passage provides cooling closer to the component operating at the higher temperature. Catalyst efficiency is maintained or increased by providing stoichiometric exhaust gases to the catalyst. As a result, engine exhaust components may be protected from higher temperatures while engine emissions are maintained or improved.

Referring now to FIG. 4, a fourth example engine is shown. The engine of FIG. 4 operates similar to the engine of FIGS. 1-3. Additionally, the engine of FIG. 4 includes many of the same components described in FIGS. 1-3. The elements of FIG. 4 that are the same as the elements of FIGS. 1-3 are labeled with the same numerical references. Therefore, for the sake of brevity, only components and operations not common with FIGS. 1-3 will be described.

The system of FIG. 4 includes an optional additional spark plug 66 in exhaust passage 165, flapper valve 402, a driveline disconnect clutch 411, a transmission 41, gear set 45, electric motor 49, turbine clutch 461, wheels 47, and transfer mechanism 43. Spark plug 66 may be activated to ignite a fuel and air mixture provided to expansion chamber 401 via fuel injector 223 and pre-turbine boost air flow control valve 371. The ignited air and fuel expands in turbine 164 to provide torque to vehicle wheels 47. Turbine 164 may selectively apply torque to wheels 47 via closing turbine clutch 461 and supplying torque from shaft 161 to gear set 45 via transfer mechanism 43 (e.g., a second gear set). Motor 49 may accelerate turbine 164 to a desired speed before combustion in expansion chamber 401 is commenced, and combustion gases drive turbine 164. Gear set 45 combines turbine torque with engine torque to provide torque at wheels 47. Transmission 41 may be a fixed ratio transmission including a plurality of gear ratios to allow engine 10 to rotate at a different speed than wheels 47. Engine 10, disconnect clutch 411, transmission 41, gear set 45, wheels 47, turbine clutch 461, electric motor 49, transfer mechanism 43, and turbine 164 may constitute a powertrain or drivetrain.

Turbine 164 may be operated in select modes including but not limited to cruise control and maximum power modes. In cruise control mode, turbine 164 may be operated while engine 10 stops rotating. Turbine 164 may be activated in cruise mode at selected vehicle speeds where turbine 164 operates at greater than a threshold efficiency. During maximum power mode, turbine 164 may be activated to augment engine power to increase drivetrain output. Additionally, turbine 164 may be activated in response to an exhaust component exceeding the component degradation threshold temperature. Specifically, turbine 164 may be activated so that engine torque output may be reduced while providing a driver demand torque. Activating turbine 164 may lower temperatures of exhaust gases purged from engine 10 since engine load may be reduced.

Flapper valve 402 reduces the possibility of excess exhaust back pressure and backflow into boost chamber 46. Expansion chamber 401 allows exhaust gases to expand so that air may pass from boost chamber 46 to expansion chamber 401 at lower boost pressures. In systems not including a spark plug in exhaust passage 165, the air and fuel exhaust gas mixture may be ignited via retarding engine spark timing. Further, in some examples, fresh air that does not participate in combustion in cylinders 30 may pass through cylinders 30 during intake and exhaust valve overlap (e.g., blow-through) so that valve 371 may be omitted.

During modes where turbine 164 is activated by igniting an air and fuel mixture in expansion chamber 401, rich exhaust gases are provided to turbine 164. Pre-turbine boost air flow control valve 371 is opened to provide a desired air flow based on turbine speed and driver demand torque to turbine 164. Fuel injected via injector 223 may also be based on turbine speed and driver demand torque.

If turbine 164 is activated in response to a temperature of an exhaust component, valve 371 may be adjusted to an open loop opening amount based on engine air flow (e.g., the amount of air flowing through the engine), engine fuel flow (e.g., the amount of fuel flowing through the engine), and the amount of fuel injected via fuel injector 223. Further, the position of valve 371 is adjusted in response to output of oxygen sensor 126 to provide a desired air-fuel ratio at an inlet of turbine 164. The desired air-fuel ratio at oxygen sensor 126 is rich of stoichiometry if exhaust component temperatures are greater than the component degradation threshold temperature. Also, fuel may be injected via injector 223 in response to a temperature of an exhaust system component (e.g., vanes of turbine 164) being greater than a component degradation threshold temperature. Engine 10 may be operated at lean best torque (e.g., (LBT), a leanest engine air-fuel ratio that is rich of stoichiometry that produces best engine torque at an engine speed, load, and knock limited spark timing) when injector 223 is activated.

Additionally, air flow through post-turbine boost air flow control valve 167 is adjusted to provide a stoichiometric exhaust gas mixture in exhaust passage 165 upstream of emissions device 70 and downstream of turbine 164. In one example, air flow through air flow through post-turbine boost air flow control valve 167 is adjusted to an open loop position based on fuel injected to engine 10, fuel injected to exhaust passage 165, and air flow through engine 10. The open loop position of valve 167 is further adjusted in response to post emissions control device oxygen sensor 125.

Figure 5:
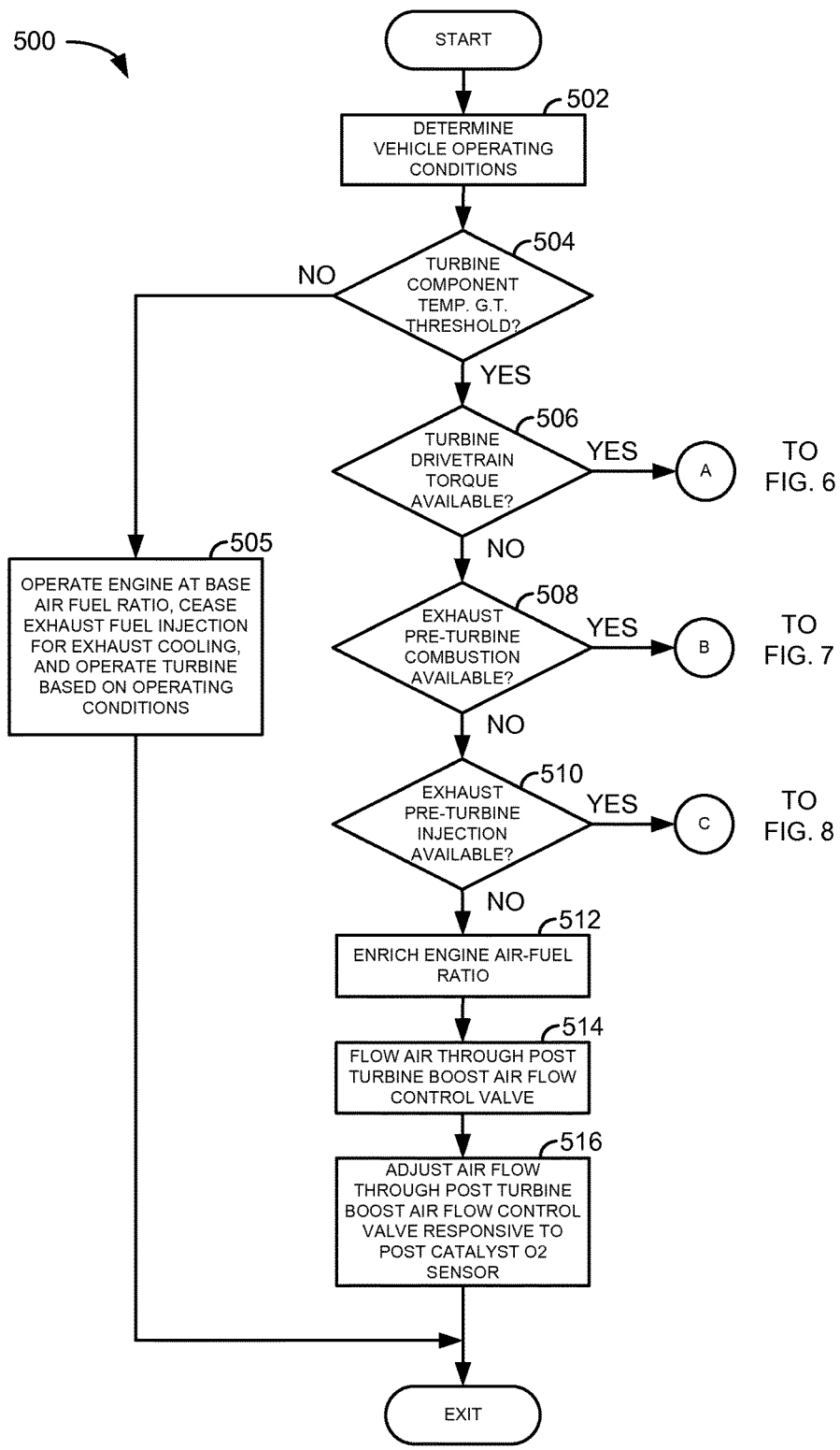
FIGS. 5-8 show an example method for operating a vehicle powertrain during high demand conditions.
Figure 6:
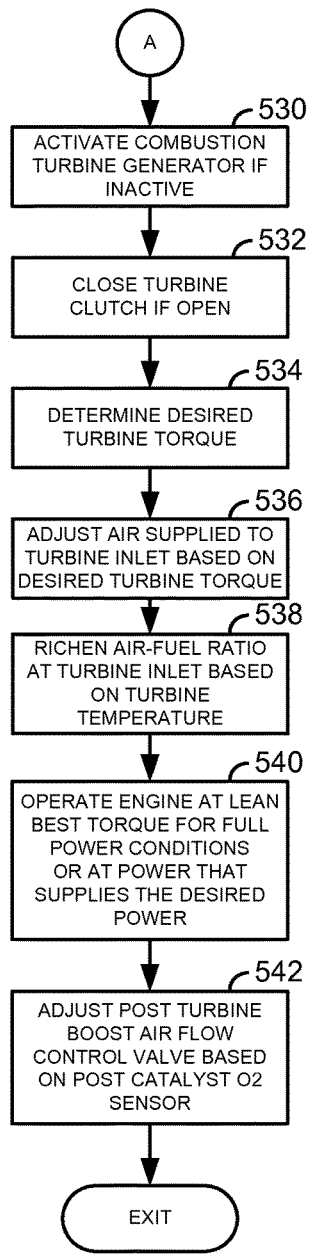
Figure 7:
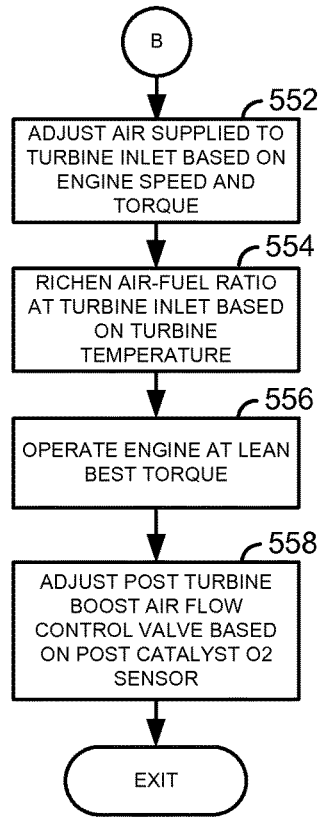
Figure 8:
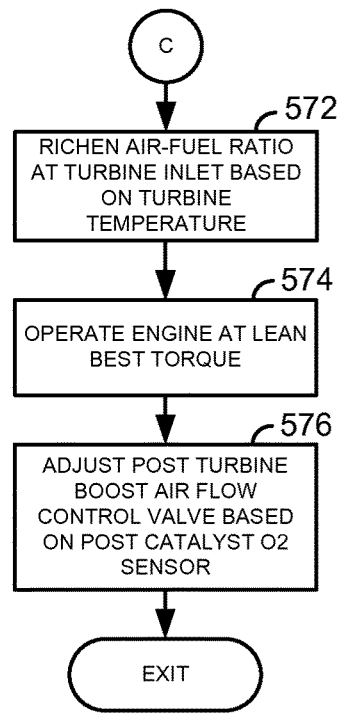

In this way, the system of FIG. 5 provides for reducing exhaust component temperatures while providing higher catalyst efficiency and turbine torque to vehicle wheels. Further, turbine torque output may be increased in response to an exhaust system component temperature while engine torque is reduced so that driver demand torque is maintained while engine torque is reduced. Reducing the engine torque may reduce engine exhaust temperatures.

Thus, the system of FIGS. 1-4 provide for an engine system, comprising: a turbine; a Miller cycle engine having a compressor and an exhaust passage, the Miller cycle engine including a first passage from an intake passage to the exhaust passage at a location downstream of the turbine, where the turbine is located along the exhaust passage; and a controller including non-transitory executable instructions to provide a stoichiometric gas mixture to a catalyst via controlling air flow through the first passage. The engine system further comprises a second passage from the intake passage to the exhaust passage at a location upstream of the turbine. The engine system includes where the catalyst is positioned along the exhaust passage at a location downstream of the turbine. The engine system further comprises additional controller instructions for providing a rich exhaust gas mixture upstream of the turbine and a stoichiometric exhaust gas mixture upstream of the catalyst. The engine system includes where the rich exhaust gas mixture upstream of the turbine is provided via injecting fuel to the exhaust passage.

Referring now to FIGS. 5-8, a method for operating a vehicle powertrain during high demand conditions is shown. The method of FIGS. 5-8 may be included in the systems of FIGS. 1-4 as executable instructions stored in non-transitory memory. Further, portions of the method of FIGS. 5-8 may be actions taken by controller 12 in the physical world to transform vehicle operating conditions.

At 502, method 500 determines vehicle operating conditions. Vehicle operating conditions may include but are not limited to vehicle speed, driver demand torque, exhaust system temperatures, engine speed, engine load, engine fuel amount, and engine air amount. Vehicle operating conditions may be determined via a controller receiving data from vehicle sensors and actuators. Method 500 proceeds to 504 after operating conditions are determined.

At 504, method 500 judges if exhaust turbine component temperature or other exhaust component temperature (e.g., catalyst temperature) is greater than (G.T.) a component threshold degradation temperature. Exhaust system component temperatures are compared to the threshold temperature. If exhaust component temperature is greater than the threshold temperature, the answer is yes and method 500 proceeds to 506. Otherwise, the answer is no and method 500 proceeds to 505.

At 505, method 500 operates the engine at a base air-fuel ratio. The base air-fuel ratio may be selected in response to engine speed and driver demand torque. Method 500 also cease fuel injection into the exhaust system for the purpose of exhaust system component cooling. However, fuel injection into the exhaust system may commence for operating the turbine during cruise, maximum torque, and other turbine operating modes. Method 500 exits after 505.

At 506, method 500 judges if exhaust turbine drivetrain torque is available. Exhaust turbine drivetrain torque is available if turbine drivetrain torque may be provided to vehicle wheels as is described in FIG. 4. If exhaust turbine drivetrain torque is available, the answer is yes and method 500 proceeds to 530. Otherwise, the answer is no and method 500 proceeds to 508.

At 508, method 500 judges if exhaust pre-turbine combustion is available. Exhaust pre-turbine combustion is available if combustion may be provided in the exhaust system upstream of the exhaust turbine as is described in FIG. 3. If exhaust pre-turbine combustion is available, the answer is yes and method 500 proceeds to 552. Otherwise, the answer is no and method 500 proceeds to 510.

At 510, method 500 judges if exhaust pre-turbine fuel injection is available. Exhaust pre-turbine fuel injection is available if fuel may be injected to an exhaust system upstream of a turbine as is described in FIG. 2. If exhaust pre-turbine fuel injection is available, the answer is yes and method 500 proceeds to 572. Otherwise, the answer is no and method 500 proceeds to 512.

At 512, method 500 operates the Miller cycle engine with an air-fuel ratio richer than stoichiometry. If the engine torque demand is high, the engine may be operated at RBT to provide fuel to cool exhaust system components. For example, the engine may be operated with an air-fuel ratio of 12.5:1. Method 500 proceeds to 514 after the engine begins operating with a rich air-fuel mixture.

At 514, method 500 opens the post-turbine boost air flow control valve. The post-turbine boost air flow control valve is commanded to a position based on the fuel amount injected to the engine during an engine cycle and air flow through the engine during the cylinder cycle. Method 500 proceeds to 516 after post-turbine boost air flow is adjusted.

At 516, method 500 further adjusts the post-turbine air flow control valve position in response to output of an oxygen sensor post or downstream of a catalyst. For example, if the oxygen sensor indicates lean, the post-turbine air flow control valve opening amount is reduced. If the oxygen sensor indicates rich, the post-turbine air flow control valve opening amount is increased to drive the oxygen sensor to indicate stoichiometric conditions. In this way, stoichiometric exhaust gases may be provided to a catalyst to improve catalyst efficiency while reducing the possibility of thermal degradation of exhaust system components. Method 500 proceeds to exit after performing closed loop control of the post-turbine boost air flow valve.

At 530, method 500 activates the combustion turbine generator if it is not activated. The combustion turbine generator may be activated via accelerating the turbine up to an operating speed via an electric motor. Further, air and fuel are supplied upstream of the turbine and ignited. The air and fuel may be ignited via a spark plug or via retarding engine spark timing and heating exhaust contents. The combusted air-fuel mixture expands and exhaust gases drive the turbine. Method 500 proceeds to 532 after the turbine is activated.

At 532, method 532 closes a turbine clutch that couples the turbine to the vehicle drivetrain and wheels. The turbine clutch is closed in response to an exhaust system component temperature being greater than a threshold temperature and the turbine being activated. Torque produced by the turbine is transferred to vehicle wheels via the turbine clutch. Method 500 proceeds to 534 after the turbine clutch is closed.

At 534, method 500 determines a desired turbine torque. If the driver is requesting maximum drivetrain torque, the desired turbine torque is maximum turbine torque. If the driver is requesting less than maximum torque, the desired turbine torque is a torque that allows engine torque to be reduced by an amount that lowers exhaust temperatures to less than the threshold temperature and the turbine to operate at a threshold efficiency. For example, if the engine is outputting 300 N-m of torque (e.g., demanded torque) and it is determined that reducing engine torque to 275 N-m will lower exhaust system component temperatures to less than the threshold temperature, but the turbine outputs a desired efficiency at 30 N-m, then the desired turbine torque is 30 N-m and engine torque is reduced to 270 N-m so that the engine and turbine provide the 300 N-m of demanded torque to the drivetrain. Method 500 proceeds to 536 after the desired turbine torque is determined.

At 536, method 500 adjusts an amount of air supplied upstream of the turbine in an expansion chamber of the exhaust system. The amount of air supplied upstream of the turbine is based on the desired turbine torque. In one example, a table of air supplied upstream of the turbine is indexed based on desired turbine torque and the table outputs a desired amount of air to supply to the turbine via the pre-turbine boost air flow control valve. The values in the table are empirically determined. The pre-turbine boost air flow control valve position is adjusted to provide the desired amount of air to the turbine. Method 500 proceeds to 538 after the pre-turbine boost air flow control valve position is adjusted.

At 538, method 500 richens an air-fuel ratio provide in the exhaust passage upstream of the turbine. In one example, fuel is injected to the exhaust passage based on exhaust component temperature and the desired turbine torque. The amount of fuel injected may be empirically determined and stored to memory in a table or function that may be indexed via desired turbine torque and exhaust component temperature. The fuel is injected to the exhaust passage upstream of the turbine. Method 500 proceeds to after fuel is injected to the exhaust passage.

At 540, method 500 operates the engine at LBT if the driver is requesting maximum torque or if the driver is requesting a torque within a predetermined torque of maximum torque. If the driver is requesting less than maximum torque, the engine is operated at a torque that provides the desired driver demand torque when combined with the turbine torque. The engine torque is adjusted via adjusting a throttle opening amount and cam timing. Method 500 proceeds to 542 after engine operation is adjusted.

At 542, method 500 adjusts the post-turbine boost air flow valve based on output of an oxygen sensor located in an exhaust passage downstream of a catalyst. The post-turbine boost air flow valve is adjusted to provide an indication of stoichiometric exhaust gases downstream of the catalyst. For example, if the oxygen sensor indicates rich, the post-turbine boost air flow valve opening amount is increased to provide a stoichiometric indication at the oxygen sensor. If the oxygen sensor indicates lean, the post-turbine boost air flow valve opening amount is decreased to provide a stoichiometric indication at the oxygen sensor. Method 500 proceeds to exit after the post-turbine boost air flow control valve is adjusted.

In this way, a turbine may transfer torque to vehicle wheels while exhaust gas temperatures are reduced. Further, catalyst performance may be maintained or improved by supplying a stoichiometric exhaust gas mixture to a catalyst during higher exhaust temperatures.

At 552, method 500 adjusts an amount of air supplied upstream or at the inlet of the turbine based on engine speed and torque (or alternatively engine load). By adjusting the amount of air supplied upstream of the turbine in response to engine speed and torque, it may be possible to provide an amount of air at the turbine inlet that is appropriate when combined with fuel to cool exhaust system components, even at higher engine speeds and loads. In one example, the amount of air supplied upstream of the turbine via the pre-turbine boost air flow control valve is empirically determined and stored to memory in a table that is indexed based on engine speed and torque. Method 500 proceeds to 554 after the amount of air to supply to the exhaust passage upstream of the turbine is determined.

At 554, method 500 richens an air-fuel ratio of gases upstream of the turbine via injecting fuel to the exhaust passage. The amount of fuel injected is based on the amount of air supplied at 552, the exhaust component temperature, and the engine air-fuel ratio. The amount of fuel injected is empirically determined and stored to a table or function that is indexed based on the amount of air supplied at 552, the exhaust component temperature, and the engine air-fuel ratio. By basing the amount of fuel injected to the exhaust system based on these parameters, it may be possible to cool exhaust system components without excessively increasing the amount of fuel supplied to the exhaust system. Method 500 proceeds to 556 after fuel injection to the exhaust system begins.

At 556, method 500 transitions the engine from stoichiometric combustion to operating the engine at LBT if desired engine torque is greater than a threshold torque. If desired engine torque is less than the threshold torque, the engine may be operated with stoichiometric combustion or richened combustion. Method 500 proceeds to 558 after the engine begins operating with at LBT, stoichiometric, or richened combustion.

At 558, method 500 adjusts the post-turbine boost air flow valve based on output of an oxygen sensor located in an exhaust passage downstream of a catalyst. The post-turbine boost air flow valve is adjusted to provide an indication of stoichiometric exhaust gases downstream of the catalyst. Method 500 proceeds to exit after the post-turbine boost air flow control valve is adjusted.

At 572, method 500 richens an air-fuel ratio of gases upstream of the turbine via injecting fuel to the exhaust passage. The amount of fuel injected is based on the exhaust component temperature (e.g., turbine fin temperature, manifold temperature, catalyst temperature, flange temperature) and the engine air-fuel ratio. The amount of fuel injected is empirically determined and stored to a table or function that is indexed based on the exhaust component temperature and the engine air-fuel ratio. By basing the amount of fuel injected to the exhaust system based on these parameters, it may be possible to cool exhaust system components without excessively increasing the amount of fuel supplied to the exhaust system. Method 500 proceeds to 574 after fuel injection to the exhaust system begins.

At 574, method 500 transitions the engine from stoichiometric combustion to operating the engine at LBT if desired engine torque is greater than a threshold torque. If desired engine torque is less than the threshold torque, the engine may be operated with stoichiometric combustion or richened combustion. Method 500 proceeds to 576 after the engine begins operating with at LBT, stoichiometric, or richened combustion.

At 576, method 500 adjusts the post-turbine boost air flow valve based on output of an oxygen sensor located in an exhaust passage downstream of a catalyst. The post-turbine boost air flow valve is adjusted to provide an indication of stoichiometric exhaust gases downstream of the catalyst. Method 500 proceeds to exit after the post-turbine boost air flow control valve is adjusted.

Thus, the method of FIGS. 5-8 provides for an engine operating method, comprising: operating a Miller cycle engine with fuel injected in an exhaust system of the Miller cycle engine at a location upstream of a turbine coupled to a crankshaft of the Miller cycle engine; and passing exhaust gases from the Miller cycle engine through the turbine. The method includes where the turbine is coupled to the crankshaft via a transmission. The method includes where the turbine is coupled to the crankshaft via a turbine clutch. The method further comprises selectively opening and closing a driveline disconnect clutch to couple the turbine to the Miller cycle engine. The method includes where exhaust gases rich of stoichiometric exhaust gases pass through the turbine.

In some examples, the method further comprises mixing the exhaust gases rich of stoichiometric exhaust gases with air from an intake manifold of the Miller cycle engine. The method includes where the mixing the exhaust gases rich of stoichiometric exhaust gases with air from an intake manifold of the Miller cycle engine is at a location in an exhaust system of the Miller cycle engine upstream of a catalyst. The method further comprises igniting the fuel injected upstream of the turbine via a spark plug.

The method of FIGS. 5-8 also provides for an engine operating method, comprising: operating a Miller cycle engine with fuel injected upstream of a turbine in an exhaust system of the Miller cycle engine; mixing the fuel injected upstream of the turbine with air from an intake system of the Miller cycle engine at a location in the exhaust system of the Miller cycle engine upstream of the turbine; and introducing an amount of air from the intake system of the Miller cycle engine to a location downstream of the turbine based on the mixture of fuel injected upstream of the turbine and air from the intake system of the Miller cycle engine at the location in the exhaust system of the Miller cycle engine upstream of the turbine.

In some examples, the method includes where introducing the amount of air from the intake system of the Miller cycle engine provides a stoichiometric exhaust gas mixture to a catalyst. The method includes where the fuel injected upstream of the turbine is combusted in an expansion chamber in the exhaust system. The method includes where the expansion chamber is upstream of the turbine. The method includes where the fuel injected upstream of the turbine is ignited via a spark plug. The method further comprises coupling the turbine to vehicle wheels. The method includes where the fuel is injected in response to an engine exhaust temperature greater that an exhaust component degradation threshold temperature.

Referring now to FIG. 9, a drivetrain operating sequence is shown. The sequence may be performed with one or more of the systems shown in FIGS. 1-4 and the method of FIGS. 5-8. Times of particular interest are indicated by vertical markers at T1 and T2.

The first plot from the top of FIG. 9 is a plot of exhaust component temperature versus time. The vertical axis represents exhaust component temperature and exhaust component temperature increases in the direction of the vertical axis arrow. The horizontal axis represents time and time increases from the left side of the plot to the right side of the plot. Horizontal line 902 represents an exhaust system component degradation threshold temperature. Exhaust system component temperatures greater than 902 may be undesirable.

The second plot from the top of FIG. 9 is a plot of exhaust fuel injection state versus time. The vertical axis represents exhaust fuel injection state. Exhaust fuel injection is activated when the trace is at a higher level near the vertical axis arrow. Exhaust fuel injection is deactivated when the trace is at a lower level near the horizontal axis. The horizontal axis represents time and time increases from the left side of the plot to the right side of the plot.

The third plot from the top of FIG. 9 is a plot of pre-turbine exhaust air-fuel ratio versus time. The vertical axis represents pre-turbine exhaust air-fuel ratio and pre-turbine exhaust air-fuel ratio increases (e.g., becomes leaner)

in the direction of the vertical axis arrow. The horizontal axis represents time and time increases from the left side of the plot to the right side of the plot. Horizontal line 904 represents stoichiometric exhaust gases.

The fourth plot from the top of FIG. 9 is a plot of exhaust turbine clutch state versus time. The vertical axis represents exhaust turbine clutch state. The exhaust turbine clutch is closed or activated when the trace is at a higher level near the vertical axis arrow. The exhaust turbine clutch is open or deactivated when the trace is at a lower level near the horizontal axis. The horizontal axis represents time and time increases from the left side of the plot to the right side of the plot.

The fifth plot from the top of FIG. 9 is a plot of pre-turbine boost air flow control valve state versus time. The vertical axis represents pre-turbine boost air flow control valve state. The pre-turbine boost air flow control valve is activated when the trace is at a higher level near the vertical axis arrow. The pre-turbine boost air flow control valve is deactivated when the trace is at a lower level near the horizontal axis. The horizontal axis represents time and time increases from the left side of the plot to the right side of the plot.

The sixth plot from the top of FIG. 9 is a plot of post-turbine boost air flow control valve state versus time. The vertical axis represents post-turbine boost air flow control valve state. The post-turbine boost air flow control valve is activated when the trace is at a higher level near the vertical axis arrow. The post-turbine boost air flow control valve is deactivated when the trace is at a lower level near the horizontal axis. The horizontal axis represents time and time increases from the left side of the plot to the right side of the plot.

The seventh plot from the top of FIG. 9 is a plot of post catalyst air-fuel ratio versus time. The vertical axis represents post catalyst air-fuel ratio and post catalyst air-fuel ratio increases (e.g., becomes leaner) in the direction of the vertical axis arrow. The horizontal axis represents time and time increases from the left side of the plot to the right side of the plot. Horizontal line 906 represents stoichiometric exhaust gases.

At time T0, exhaust temperature is less than threshold 902, the pre-turbine and post catalyst air-fuel ratios are stoichiometric, and exhaust fuel injection is deactivated. Additionally, the exhaust turbine clutch is open and the pre and post turbine boost air flow control valves are closed so that engine intake air is not directed to the engine exhaust system.

Between time T0 and time T1, the exhaust component temperature increases in response to an increase in engine speed and demand torque (not shown). The increase in engine speed and demand torque may be based on an increase in driver demand torque.

At time T1, the exhaust component temperature exceeds threshold 902. Consequently, exhaust component cooling is activated by activating the exhaust turbine and richening the air-fuel ratio in the exhaust system upstream of the exhaust turbine. The pre-turbine boost air flow control valve opens as indicated by the pre-turbine boost air flow control valve state transitioning to a higher level. Further, exhaust fuel injection is activated as indicated by the exhaust fuel injection state transitioning to a higher level. The turbine clutch is also closed as indicated by the turbine clutch state transitioning to a higher level so that torque produced by exhaust turbine may be transferred to the drivetrain. The post-turbine boost air flow control valve opens as indicated by the pre-turbine boost air flow control valve state transitioning to a higher level to provide stoichiometric gases to a catalyst that processes engine exhaust gases.

By richening the air-fuel ratio upstream of the turbine, turbine fins may be cooled. Further, activating the turbine allows the turbine to provide torque to meet driver demand or to allow engine torque to be reduced to meet driver demand. Reducing engine torque may further reduce exhaust component temperatures. The richened exhaust cools the exhaust component temperature to a level just below threshold 902. Further, the engine is operated at LBT to reduce engine fuel consumption.

At time T2, the driver reduces the driver demand torque (not shown) causing exhaust component temperature to be reduced to a threshold level below threshold 902. As a result, exhaust component cooling is deactivated by deactivating the exhaust turbine and returning the engine to stoichiometric combustion. The exhaust turbine is deactivated by ceasing exhaust fuel injection and closing the pre-turbine boost air flow control valve. The post-turbine boost air flow control valve is closed so that the exhaust air-fuel ratio does not become lean of stoichiometry.

Throughout the process of activating exhaust component cooling, gases are supplied to a catalyst processing engine exhaust at a stoichiometric value. Further, the turbine is activated to improve drivetrain torque production.

As will be appreciated by one of ordinary skill in the art, the method described in FIGS. 5-8 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Further, the methods described herein may be a combination of actions taken by a controller in the physical world and instructions within the controller. At least portions of the control methods and routines disclosed herein may be stored as executable instructions in non-transitory memory and may be carried out by the control system including the controller in combination with the various sensors, actuators, and other engine hardware. Although not explicitly illustrated, one of ordinary skill in the art will recognize that one or more of the illustrated steps, methods, or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. An engine operating method, comprising:
    operating a Miller cycle engine with fuel injected in an exhaust system of the Miller cycle engine at a location upstream of a turbine coupled to a crankshaft of the Miller cycle engine; and
    passing exhaust gases from the Miller cycle engine through the turbine, where the turbine is coupled to the crankshaft via a transmission and where the turbine is coupled to the crankshaft via a turbine clutch; the method further comprising closing the turbine clutch in response to a temperature of an exhaust component exceeding a threshold.

2. The method of claim 1, further comprising selectively opening and closing a driveline disconnect clutch to couple the turbine to the Miller cycle engine.

3. The method of claim 1, where exhaust gases rich of stoichiometric pass through the turbine.

4. The method of claim 3, further comprising mixing the exhaust gases rich of stoichiometric with air from an intake manifold of the Miller cycle engine.

5. The method of claim 4, where the mixing the exhaust gases rich of stoichiometric with air from the intake manifold of the Miller cycle engine is at a location in the exhaust system of the Miller cycle engine upstream of a catalyst and downstream of the turbine.

6. The method of claim 1, further comprising igniting the fuel injected upstream of the turbine via a spark plug.

7. An engine operating method, comprising:
in response to a temperature of exhaust of a Miller cycle engine being greater than an exhaust component degradation threshold temperature, injecting an amount of fuel in an exhaust system of the Miller cycle engine upstream of a turbine while operating the Miller cycle engine, the turbine arranged upstream of a catalyst in the exhaust system;
introducing an amount of air from an intake system of the Miller cycle engine to a location in the exhaust system upstream of the turbine via a second passage;
at the location in the exhaust system upstream of the turbine, mixing the amount of fuel injected in the exhaust system upstream of the turbine with the amount of air introduced from the intake system via the second passage; and
introducing an amount of air from the intake system to a location downstream of the turbine and upstream of the catalyst via a first passage, the amount of air introduced via the first passage based on the amount of fuel injected in the exhaust system upstream of the turbine and the amount of air introduced from the intake system via the second passage.

8. The method of claim 7, where the turbine is coupled to a crankshaft of the Miller cycle engine via a turbine clutch, the method further comprising closing the turbine clutch in response to the temperature of the exhaust being greater than the exhaust component degradation threshold temperature.

9. The method of claim 7, wherein the amount of fuel injected in the exhaust system upstream of the turbine is based on turbine speed and driver demand torque.

10. The method of claim 7, where introducing the amounts of air from the intake system to the exhaust system provides a stoichiometric exhaust gas mixture to the catalyst.

11. The method of claim 7, where the amount of fuel injected upstream of the turbine is combusted in an expansion chamber in the exhaust system.

12. The method of claim 11, where the expansion chamber is upstream of the turbine.

13. The method of claim 7, where the amount of fuel injected upstream of the turbine is ignited via a spark plug.

14. The method of claim 6, further comprising coupling the turbine to vehicle wheels.

15. An engine system, comprising:
a Miller cycle engine having a compressor, an exhaust passage, a turbine located along the exhaust passage, a catalyst located along the exhaust passage downstream of the turbine, and a fuel injector configured to inject fuel to the exhaust passage upstream of the turbine, the Miller cycle engine further including a first passage from an intake passage to the exhaust passage at a location downstream of the turbine and upstream of the catalyst, and a second passage from the intake passage to the exhaust passage at a location upstream of the turbine; and
a controller including non-transitory executable instructions to:
flow a rich exhaust gas mixture through the turbine via adjusting an amount of fuel injected by the fuel injector and controlling air flow through the second passage; and
provide a stoichiometric gas mixture downstream of the turbine and upstream of the catalyst via controlling air flow through the first passage.

16. The engine system of claim 15, wherein the turbine is coupled to a crankshaft of the Miller cycle engine via a turbine clutch, and wherein the controller further comprises non-transitory executable instructions to close the turbine clutch in response to a temperature of engine exhaust being greater than an exhaust component degradation threshold temperature.

* * * * *